March 10, 1925. 1,528,836
C. T. McELVANEY
SINGLE ACTING REVERSIBLE STEAM ENGINE
Filed March 2, 1922 7 Sheets-Sheet 1

Inventor
Charles T. McElvaney
By Lancaster and Allwine
Attorneys

March 10, 1925.

C. T. McELVANEY

1,528,836

SINGLE ACTING REVERSIBLE STEAM ENGINE

Filed March 2, 1922   7 Sheets-Sheet 5

Inventor
Charles T. McElvaney,
By Lancaster and Allwine
Attorneys

Patented Mar. 10, 1925.

1,528,836

UNITED STATES PATENT OFFICE.

CHARLES T. McELVANEY, OF PARSONS, KANSAS.

SINGLE-ACTING REVERSIBLE STEAM ENGINE.

Application filed March 2, 1922. Serial No. 540,601.

*To all whom it may concern:*

Be it known that I, CHARLES T. MC-ELVANEY, a citizen of the United States, residing at Parsons, in the county of Labette and State of Kansas, have invented certain new and useful Improvements in Single-Acting Reversible Steam Engines, of which the following is a specification.

This invention relates to improvements in steam engines.

The primary object of the invention is the provision of a steam engine embodying a novel reversing arrangement, whereby the crank shaft may be driven forward or in reverse direction by utilizing just sufficient power to operate the same under a particular circumstance.

A further object of the invention is the provision of a novel type of steam engine so arranged and designed as to include a minimum of operating parts, which are to a certain extent interchangeable, requiring little if any adjustment, and thus providing a simple and compact steam engine, capable of use in connection with propelling of motor vehicles, being particularly desirable for use in this connection by reason of its low center of gravity and light weight.

A further object of this invention is the provision of an improved valve arrangement for control of motor fluid through the cylinders of a steam engine.

A further object of the invention is the provision of a single acting reversible steam engine of the V-shaped type, embodying simple and accurate mechanism for control of motor fluid, whereby the same may be operated for forward or reverse driving.

Another object of the invention is the provision of an improved valve control mechanism for steam engines, susceptible of adjustment in order to reverse the direction of movement of the engine crank shaft, and embodying details adapted to regulate the travel of a valve member in variable manner, to conform with the cycle of engine operation.

Other objects and advantages will be apparent during the course of the following detailed description.

In the accompanying drawings, forming a part of this specification, and wherein similar reference characters designate corresponding parts throughout the several views.

In the drawings, wherein for the purpose of illustration is shown a preferred embodiment of the improved single acting reversible steam engine, the letter A generically indicates the improved single acting reversible engine, and which embodies a casing or housing B; crank shaft C; piston arrangement D; valve arrangement E for control of a motor fluid; valve regulating mechanism F; and intake and exhaust pipe arrangement G.

Figure 3:
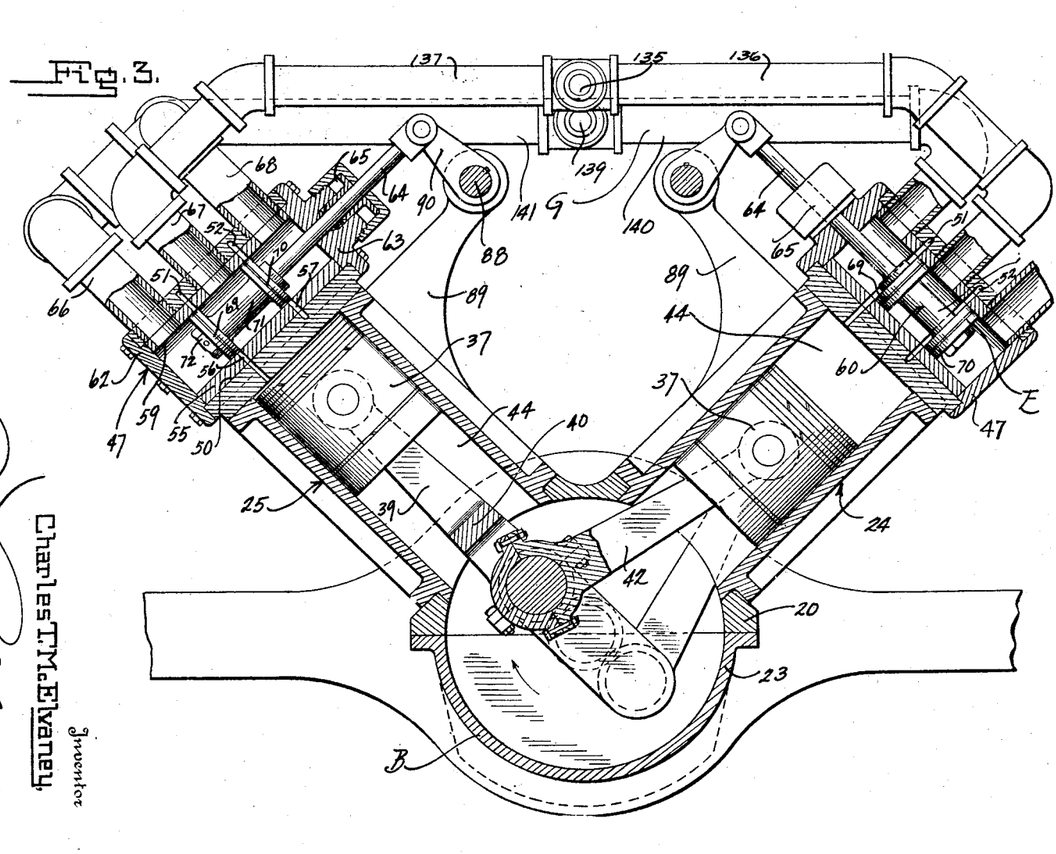
Figure 3 is a transverse cross sectional view, taken through several cylinders of the improved engine and showing the mechanism which cooperates therewith for control of a motor operating fluid.

The casing or housing B may, of course, be of various sizes and dimensions, to conform to the horse power desired for a particular use. However, it is preferred that an upper crank case portion 20 be provided having a pair of axially aligning bearing caps 21 and 22 arranged thereon for receiving the ends of the crank shaft C. A lower crank case portion 23 is provided, for attachment, as by bolts, to the upper crank case portion 20. The upper crank case portion 20 is of such formation as to permit the placement of right and left pairs of cylinders 24 and 25 thereon, in V-shaped arrangement, both pairs being placed at an inclination of 45° to the horizontal, so that the right and left pairs are arranged at preferably 90° to each other, and as is clearly shown in Figure 3 of the drawings.

The crank shaft C may be of any preferred construction according to the number of cylinders in the engine. However, it is preferred that the crank shaft C include one throw 27 adapted for use in connection with the front cylinders of each pair of cylinders, and a second throw 28 for the rear or back cylinders of said pairs of cylinders. A spindle end 29 which in fact, is the rear end of the crank shaft bears in a bushing 31, of brass, babbitt, or similar material, so that the same is in fact, journalled in the bearing cap above described. The spindle end 29 projects outwardly of the casing B and is preferably provided with a screw threaded shank portion 32, adapted for use in connecting the crank shaft to any driven shaft (not shown). The opposite end 33 of the crank shaft is in axial alignment with the spindle end 29, and in fact, is journalled in a bushing 34 which is disposed in the bearing cap 21 above mentioned. The spindle end 33 of the crank shaft C is provided with a shoulder 34ª, having a reduced end 35 extending outwardly therefrom, said shoulder 34ª being provided for receiving a nut 35ª thereagainst to retain a detail of the improved valve regulating mechanism F on the shaft C.

The piston arrangement D, is novel to a certain extent. As can readily be seen the front cylinder pistons of the pairs of cylinders are connected to a single throw 27 of the crank shaft C, while the rear cylinder pistons are connected to the other throw 28 of the crank shaft. The pistons 37 are of the hollow trunk type. Two types of connecting rods are used with each throw of the crank shaft, in order that the pistons in cooperating opposite cylinders may be operatively connected to the crank shaft. These rods are of the hinge joint type, providing one type of rod 39 having a forked end 40 adapted for fitting over a bushing 41 on the crank shaft, the other type of connecting rod 42 having a clamping ring end 43 adapted for fitting about the crank shaft bearing 41 intermediate the forked ends of the type of connecting rod 39. Since the throws 27 and 28 of the crank shaft C are at 180° with respect to each other, it can be readily seen that when one piston 37 connected to a throw of the crank shaft, is at the start of its cylinder, the other piston 37 cooperating therewith in a cylinder opposite will have its piston downwardly in the cylinder in which it cooperates. It can thus readily be seen that the piston arrangement working in the front cylinders 44 of each of the pairs 24 and 25 are connected to the throw 27 of the crank shaft C, whereas the piston arrangement in the rear cylinders 45 of each pair of cylinders 24 and 25 are connected to the rear throw 28 of said crank shaft C.

The valve arrangement E for control of a motor fluid contemplates the provision of similar valve devices 47 for each pair of cylinders 24 and 25. These valve devices 47 are identical for each pair of cylinders, and for brevity, but one of the devices will be explained in detail. Taking up the description of that valve device 47 adapted for cooperation with the left hand pair of cylinders 25, the same includes a cylinder head piece 49 preferably cast to cover both front and rear cylinders 44 and 45. A valve chamber 50, of cylindrical formation, is provided in the head piece 49 extending substantially at right angles to the axes of the cylinders 44 and 45. Circumferential ports 51 and 52 are provided, in the head piece 49, which have offset openings so that the same may communicate respectively with the forward and rear cylinders 44 and 45. These ports 51 and 52 are formed in definitely spaced relation axially of the bore 50, the former being to the left. A cast iron bushing 55 is preferably provided for secure and fixed disposition within the passageway 50 having two series of openings 56, and 57 drilled or otherwise formed therein for respective cooperation with the circumferential ports 51 and 52. These openings 56 and 57 are drilled in radial manner circumferentially about the hollow bushing 55. The bore 59 of the bushing 55 is finished to provide a chamber for reciprocation of a valve member 60 therein. An outside cap 62 may be detachably secured to the outer end of the valve device 47, to prevent escape of motor fluid through the end of the chamber 59, and similarly a detachable cap arrangement 63 may be provided for the inner end of each of the valve devices 47 adapted for reciprocably receiving the valve member rod 64 therethrough, and preferably include a packing nut 65. A steam intake conduit 67 may be provided leading into the valve chamber 59, intermediate the ports 51 and 52; said ports having exhaust conduits 66 and 68 respectively provided for use in connection with exhaustion of steam from the front and rear cylinders.

The valve member 60 is of peculiar construction, and is preferably of the piston type adapted for snug fitting within the bore 59 provided therefor, and adapted for controlling admission and exhaust of steam to and from the cylinders of the engine. This valve member 60 includes a pair of disc like control heads 69 and 70, both of the same diameter and thickness, and preferably including outer piston rings to prevent loss of steam in the chamber 59. These heads 69 and 70 are preferably connected by a reduced sleeve portion 71 and having the rod 64 connected therethrough as by an adjusting nut 72. Spacing of the control heads 69 and 70 is in exact relation to the spacing of the ports 51 and 52, in order that they may respectively cooperate therewith.

The valve regulating mechanism F has been provided for synchronizing the valve movement by connection to the crank shaft C, to conform to the cycle of engine operation. This means F is preferably mounted within a casing 75 mounted forwardly of the steam engine A. This casing 75 includes a detachable cover 76 upon which is provided a packing nut 77 whereby the crank shaft spindle end 35 may extend therefrom for driving any suitable mechanism, such as pumps and the like. The attachment of this cover 76 to the casing 75, is, of course, leak proof, in order that the details of the valve operating mechanism F may run or operate in oil or other lubricant.

Figure 4:
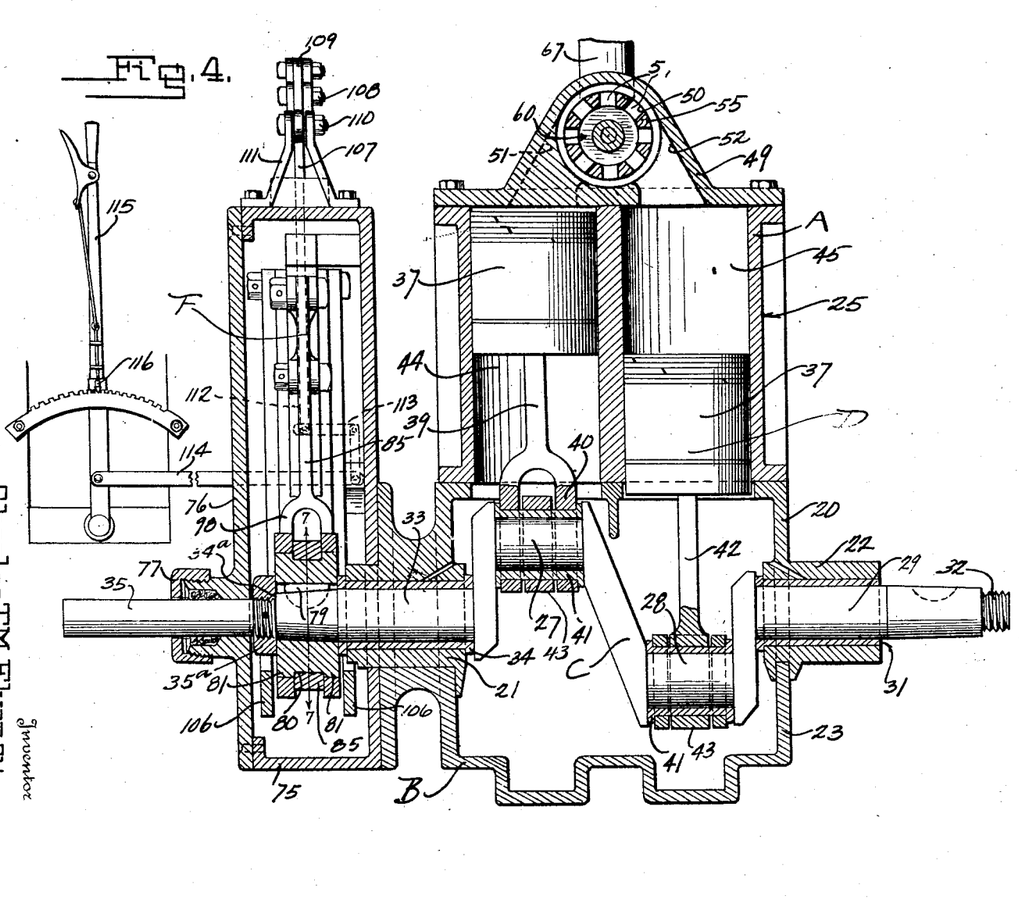
Figure 4 is a longitudinal cross sectional view taken through the improved steam engine substantially parallel with the axis of the crank shaft, and showing the manner in which cylinders and their operating pistons are connected to the crank shaft.
Figure 5:
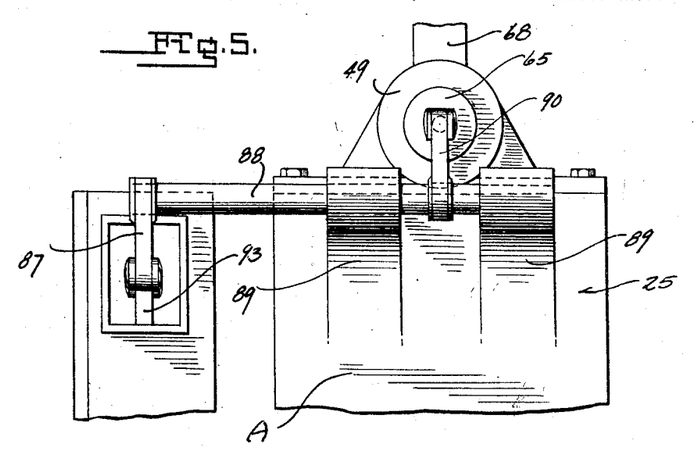
Figure 5 is a fragmentary side elevation of a portion of the valve controlled mechanism.
Figures 6, 7:
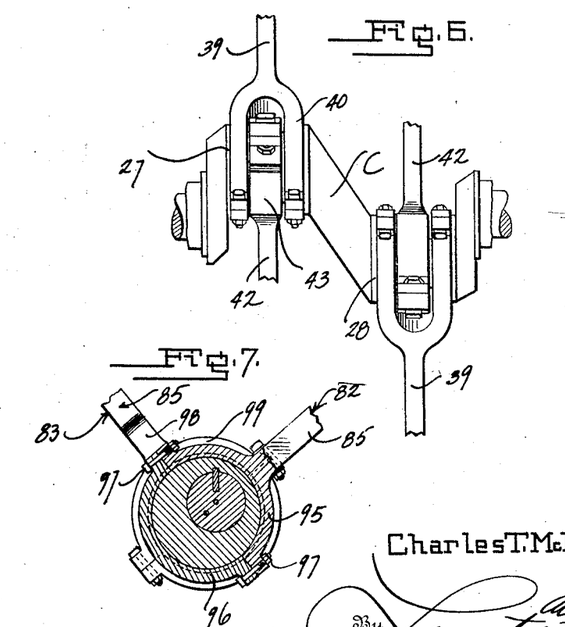
Figure 6 is a fragmentary view showing the manner in which piston rods are connected for operation to the throws of a crank shaft.
Figure 7 is a cross sectional view, taken on the line 7—7 of Figure 4.

An eccentric cam 78 having a single throw portion, is keyed, as at 79 upon the spindle end 33 of the crank shaft C, and of course, within the casing 75. This cam 78 is provided with a central circumferential groove 80 having the lateral flanged portion 81 on each side thereof, and as can be seen in Figure 4 of the drawings. The depth of this groove 80 is uniform about the circumference of the cam member 78, in order that the outer surfaces of the cam at the groove and on the flanges thereof may be in conformity. The sets of cylinders 24 and 25 are provided with linkages 82 and 83 respectively, which are substantially the same and adapted to operate the valve members 60 thereof.

The linkage arrangements 82 and 83 each include an eccentric lever arm 85 pivotally connected to the cam 78; a fulcrum arm 86 pivotally connected to the casing 75 and to the eccentric arm 85 intermediate its ends; a rocker arm 87 mounted upon a shaft 88 extending along the outside of the engine casing B and rotatably mounted in brackets 89 formed thereon; a rocker arm 90 carried by shaft 88 and pivotally connected as at 91 to the outer end of the valve reciprocating rod 64; and a connecting link 93 which is pivotally connected intermediate the free ends of the rocker arm 87 and eccentric lever 85. It is preferred that the eccentric arm 85 of the linkage device 82 be provided with a segmental portion 95 rigid upon the end thereof and having a segmental portion 96 which may be detachably fixed thereto as by bolts 97 and whereby the said arm 85 of the linkage arrangement 82 may be pivotally connected within the groove 80 provided in the cam 78. In order to provide for simple and accurate working of the eccentric arms 85, the arm 85 of the linkage arrangement 83 is forked at its end 98 to have a pair of spaced segments 99 extending therefrom in rigid relation thereto; each of said segments 99 having a cooperating detachable segment portion 100, and whereby the forked end of this eccentric arm 85 is pivotally connected to the flanges 81 of the cam 78. By the arrangement of the ends of these eccentric arms 85, all liability of lateral displacement of the same from the cam 78 is obviated.

In order to provide for reversibility of the steam engine, the end 101 of each of the fulcrum arms 86 is not only pivoted to the casing 75 but may be manually slid to so effect the linkage arrangements 82 and 83, as to operate the various valve 60 to reverse the direction of rotation of the crank shaft C. To this end, the fulcrum arms 86 of the linkage arrangements 82 and 83 are each provided with a guide member 102 having an arcuate groove 103 therein adapted for receiving a pin 104 in the end 101 of the fulcrum arms, and whereby the same may be moved therein for effecting proper movement of the linkage mechanisms 82 and 83. These guide members 102 may be of any shape although the grooves 103 therein are struck from centers 104ᵃ located in exact angular and linear relation to the axis of the crank shaft C. Bridle rods 106 are provided upon each side of the guides 102 and eccentric 78, pivotally connecting the ends 101 and the pins 104 of the fulcrum arms 86 in definitely spaced relation for synchronous movement.

The movement of the pins 104 in their guide members 102 is of course manually effected, in order to provide for reversing of the engine, and any approved mechanism for such reversing action may be provided. To this end, a rod 107 may extend from the casing 75, the same being pivotally connected to the pin 104 of the linkage mechanism 83. This lever 107 may be pivotally connected as at 108 midway between the ends of a rocker arm 109 which has an end pivotally connected to a bracket structure 111 fixed upon the outer surface of the casing 75. The free end of the lever 109 may be pivotally connected to an operating rod 112, the lower end of which is connected to a bell crank lever 113. An opposite end of the bell crank lever 113 is connected by a rod 114 pivotally fixed to a hand operating lever 115, including a pawl arrangement 116 to hold the same in defined relation, and whereby the ends 101 of the fulcrum arms 86 may be held in any desired position within the guide ways 102 provided therefor.

Figure 1:
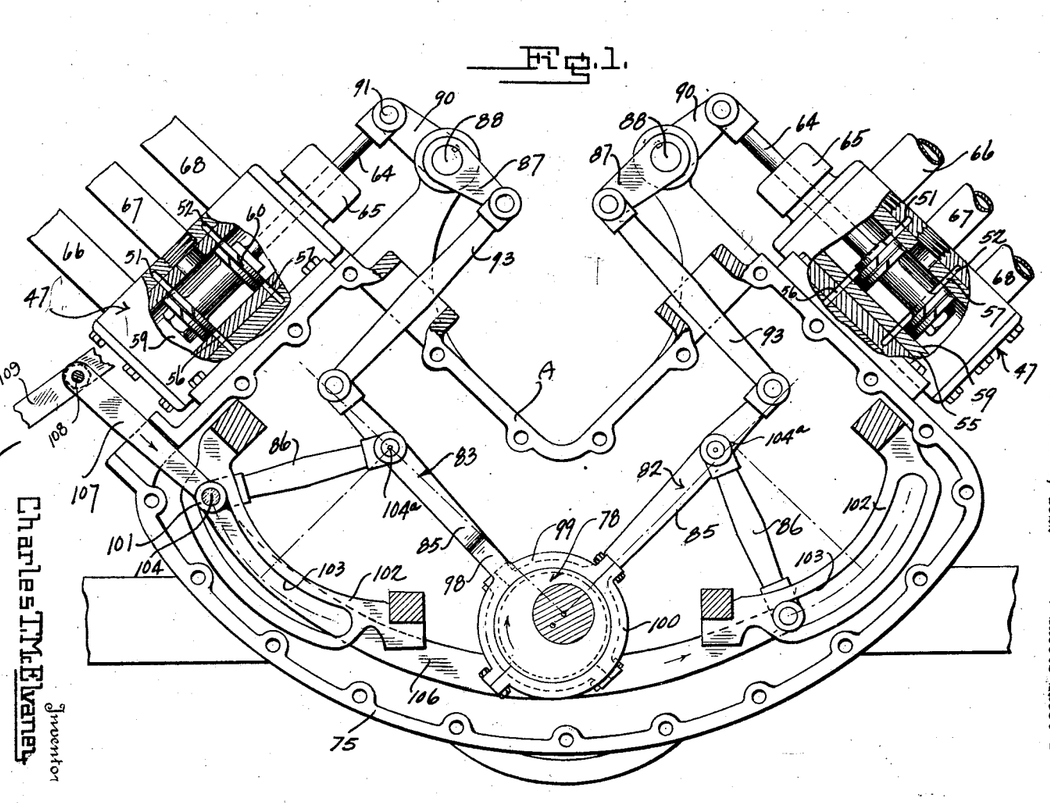
Figure 1 is a front elevation of the improved engine, partly in section, showing certain cooperating details for regulating the driving of a crank shaft in a clockwise direction.
Figure 10:
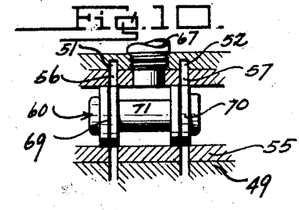
Figures 10, 11, 12 and 13 are fragmentary cross sectional views showing the progressive positioning of a valve member in its chamber for each quarter turn of a crank shaft, illustrating the manner in which a motor fluid is regulated with respect to its flow into the cylinders of the steam engine.
Figure 11:
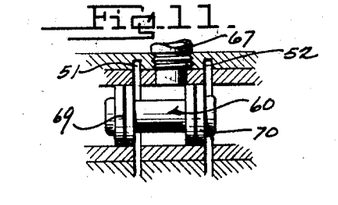
Figure 12:
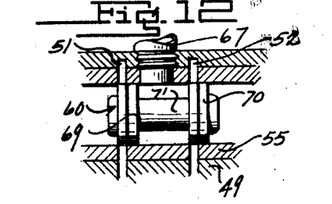

In operation, assuming the linkage mechanisms 82 and 83 to be in the position illustrated in Figure 1. The crank shaft C will then be driven in a clockwise direction. The valve device 47 for the left hand pair of cylinders 25 will be in the position illustrated in Figures 1 and 10 and moving to the left in order to permit admission of steam to the front cylinder 44 of the left hand pair of cylinders 25, and permit exhaust of expanded steam from the rear cylinder 45 thru its control port 52. The throw of the cam or eccentric 78 is at right angles to the alignment of the throws upon the crank shaft C. In the diagrammatic views of Figures 8 and 9, the positions of the eccentric arm 85, rocker arms 87 and 90 upon the shaft 88, and the connecting link or lever 93 has been shown for each quarter turn of the cam 78 from the position illustrated in Figure 1. Thus, the solid line 120 illustrated in Figure 8, defines the position of the linkage mechanism 83 as the same appears in Figure 1. As the eccentric 78 moves clockwise for a quarter turn, this linkage mechanism is oscillated to the position illustrated in dot and dash lines 121, and as can readily be seen in Figure 8, the free end of the rocker arm 90 is moved from a position 122 to a position 123 for the distance "a". This distance "a" represents the travel of the valve member 60 from the position illustrated in Figures 1 and 10 to the position illustrated in Figure 11. The movement of the piston arrangement in the left hand cylinders 25 during this quarter turn of the crank shaft and eccentric cam, assume the position in Figures 14 and 15. During the next quarter turn of the eccentric cam 78, the linkage mechanism 83 is thrown from the dot and dash line position 121 illustrated in Figure 8, to the dotted position 125 illustrated in this view. It will be noted that the fulcrum arm 86 has an important bearing upon the path of movement of the rocker arms. During this last mentioned quarter turn of the cam, the free end of the rocker arm 90 will be moved from the position 123 above mentioned, to the position 126 for the distance "b". Thus, the valve member 60 during this quarter turn will move just twice the distance that the same will move from the preceding quarter turn. In other words, the valve member 60 will be automatically shifted from the position illustrated in Figure 11 to that illustrated in Figure 12. During this movement of the valve member 60 from its position illustrated in Figure 11 to that illustrated in Figures 16 and 12, the steam from the intake conduit 67 will be cut off from the front cylinder 44 by reason of closing of the port 51, and the rear cylinder 45 will exhaust the expanded steam therein thru the right hand port 52 provided therefor. The piston arrangement during this valve operation will move from the position illustrated in Figure 15 to that illustrated in Figure 16.

It should be noted that the space in the valve chamber 59 between the valve member disc heads 69 and 70, is at all times filled with live steam, ready to enter either of the ports 51 and 52. On the other hand, the spaces in the valve chamber 59 on the outsides of the disc heads 69 and 70 are for the entrance of exhaust or expanded motor fluid, and ready to be forced into the exhaust conduits 66 and 68 whenever the valve member 60 uncovers the ports 51 or 52 for that purpose. Thus, it can be seen that as the valve member 60 shifts from the position illustrated in Figure 10, to that of Figure 11, the left hand port 51 will be slowly opened to permit live steam to enter the front cylinder 44, whereas the other port 52 will be opened to the valve chamber outside of the control head 70 to permit dead or exhaust steam to flow outwardly through the rear cylinder 45, through the port 52 and to exhaust through the conduit 68 provided therefor. As the valve member 60 moves from the position illustrated in Figure 11 to the position illustrated in Figure 12, the ports will be closed to cut off the steam with respect to the ports.

Figures 8, 9:
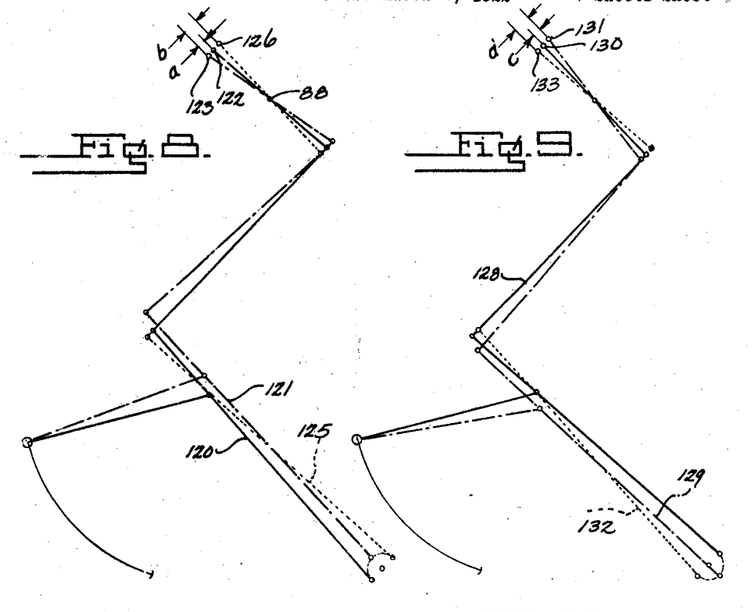
Figures 8 and 9 are diagrammatic illustrations of the manner in which a valve control mechanism of the improved steam engine is disposed under various movements of the valve member cooperating therewith.
Figure 13:
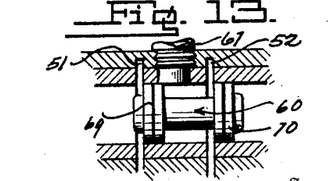
Figure 17:
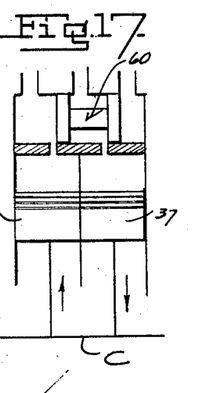

Referring to Figure 9, the full line 128 therein designates the position of the linking mechanism 83, as indicated in the dotted line in Figure 8. During the next quarter turn clockwise of the eccentric cam 78, the linkage mechanism 83 will move from the position 128 to the dot and dash position 129. This movement of the linkage mechanism 83 will effect movement of the free end of the rocker arm 90 from the position 130 to the position 131 for the distance of travel "c." Thus, the valve member 60 during such quarter turn of the eccentric 78 will move from the position illustrated in Figure 12, to the position illustrated in Figure 13, for effecting regulation of the intake and exhaust of steam in order that the piston arrangement in the cylinders may move from the position illustrated in Figure 16, to that illustrated in Figure 17. It will be noted that this distance "c" is the same as the distance "a" above referred to. During the quarter turn of the eccentric or cam 78, the linkage mechanism 83 will move from the position in the dot and dash position 129 to the dotted position 132, which will effect a movement of the free end of the rocker arm 90 from the position 131 to the position 133, for a distance "d." This distance "d" is equal to the distance "b" above referred to, and has the effect of throwing the valve member 60 from the position illustrated in Figure 13, back to the original position illustrated in Figure 10. During the movement, the piston arrangement will move from the position illustrated in Figure 17 to that illustrated in Figure 14. Thus, during a complete revolution of the cam 78, the linkage mechanism 83 will so control the valve member 60 as to regulate the intake and exhaustion of steam to and from the left hand cylinders 25 of the improved engine A, and as can readily be determined from the above descriptions and illustrations referred to therein.

Figure 14:
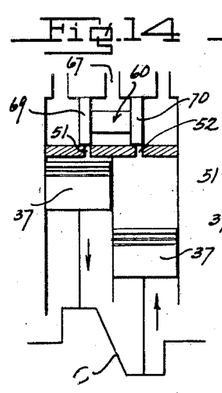
Figures 14, 15, 16 and 17 are diagrammatic illustrations of the manner in which a valve member is utilized for controlling operation of an engine crank shaft.
Figures 15, 16:
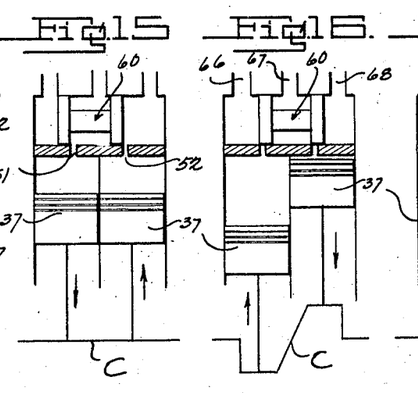

The movement of the linkage mechanism 82 for controlling the right hand cylinders 24 of the engine A, synchronizes with the movement of linkage mechanism 83 in order to effect a perfect operation of the engine A. As is illustrated in Figure 1, the link mechanism 82 maintains its valve 60 in the position illustrated in Figures 1 and 13. During successive movements of the cam 78, the linkage mechanisms 82 will be controlled altogether similar to the linkage mechanism 83 above described, in order to effect the variable travel of the valve member 60 for controlling the piston arrangement in the front and rear cylinders of the right hand pair of cylinders 24. As an indication of the co-operation of the linkage mechanisms 82 and 83, it should be observed that when the left hand valve member 60 is in the position illustrated in Figure 14, the right hand valve member 60 will be in the position illustrated in Figure 17, and the piston arrangement in the cylinders will be substantially the same as that illustrated in these views. When the right hand valve and piston arrangement is similar to that illustrated in Figure 15, the left hand valve and piston arrangement will be that as illustrated in Figure 16. As the left hand valve and piston arrangement assumes the position illustrated in Figure 16, the right hand valve and piston arrangement will move to the position illustrated in Figure 15. As the left valve and piston arrangements progress to the position illustrated in Figure 17, the right hand valve and piston arrangement will progress as illustrated in Figure 14. It can thus be seen that the valve and piston arrangement of the right and left hand sets of cylinders synchronize to provide a perfect working steam engine.

Figure 18:
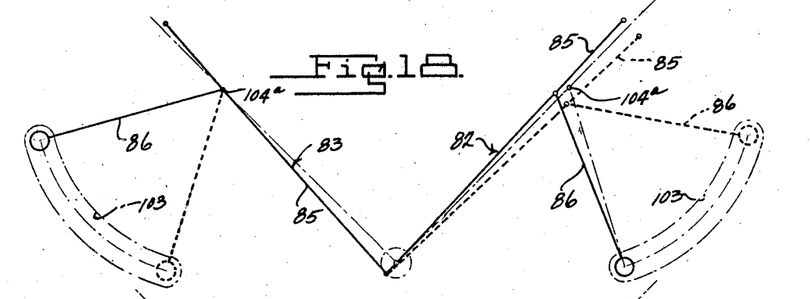
Figures 18 and 19 are diagrammatic illustrations of the various positionings of a valve control mechanism, showing the manner in which the same may be shifted for reversing the direction of rotation of the engine crank shaft.

The above description of the operation has been restricted to the position of the linkage mechanisms 82 and 83 when the operating lever 107 and its cooperating mechanism is in such position as to maintain the fulcrum arms 86 in the left hand end of the guideway slot 103. However, when the fulcrum arms 86 are moved in their slots 103 to the extreme right hand ends thereof, the valves 60 will be so thrown as to divert the steam into the engine A to reverse the operation of the crank shaft C in an anti or counterclockwise direction. This movement of the fulcrum arms 85 in order to effect the desired valve positionings can best be understood by referring to Figures 1, 2, 18 and 19 of the drawings. The diagrammatic illustration of a portion of the linkage mechanisms 82 and 83 as illustrated in full lines in Figure 18, indicates the positioning of the details as illustrated in Figure 1. It will be noted, that when the pivot point of the eccentric lever 85 and fulcrum arm 86 of the left hand linkage mechanism 83 is concentrically arranged upon the center from which the slot 103 is struck in the guide member 102 the pin 104 and end of the fulcrum arm 101 may be shifted in this slot 103 from end to end without movement of the eccentric lever 85 of said left hand linkage mechanism 83 whatsoever. However, with respect to the eccentric lever and fulcrum arm of the right hand linkage mechanism 82, since the pivotal connection of these elements is not concentrically arranged with the center point 104$^a$ from which the right hand slot 103 is struck, it can readily be seen that movement of the fulcrum arm 86 in its guide slot 103 will effect a movement of the right hand eccentric lever. This movement of the right hand eccentric lever is illustrated in Figure 18, where the fulcrum arms 86 have been so shifted from the left hand ends of the guide slots 103 to the opposite ends of the slots, as to effect a movement of the right hand eccentric lever from the full line to the dotted position illustrated therein in diagrammatic form.

Figure 2:
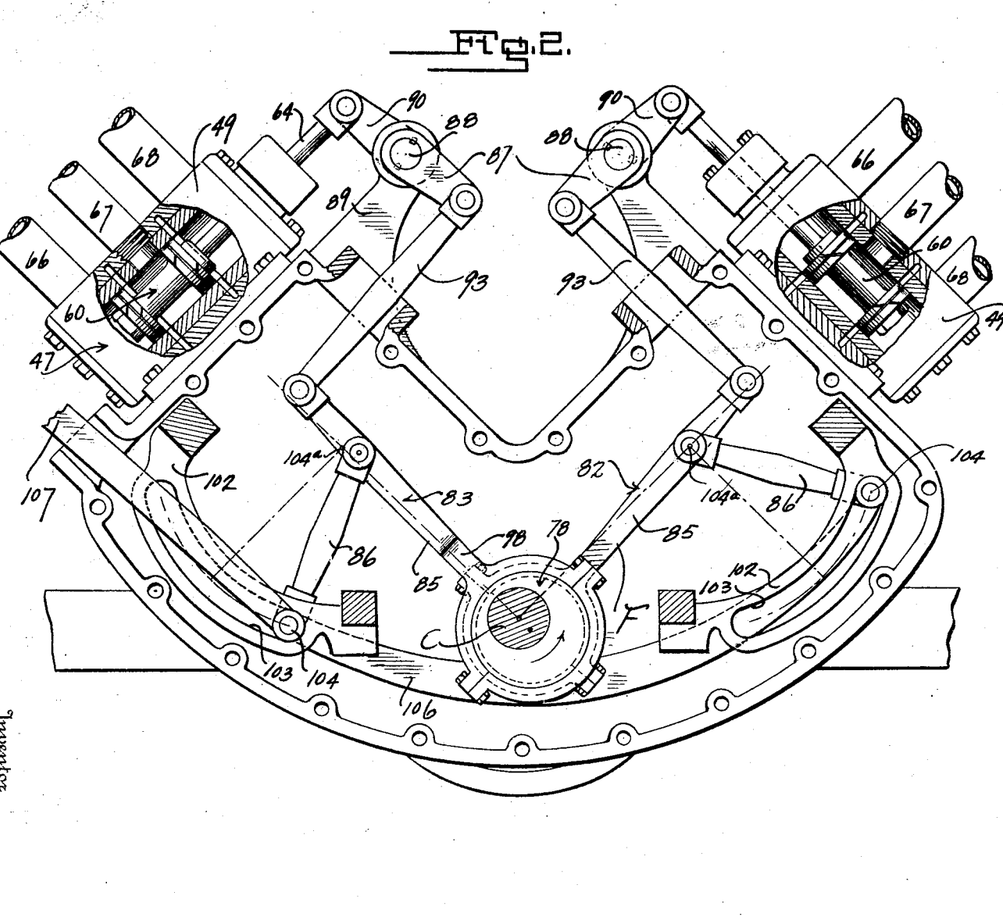
Figure 2 is a view altogether similar to Figure 1, however, showing the details arranged to provide for a counter-clockwise movement of the engine crank shaft.
Figure 19:
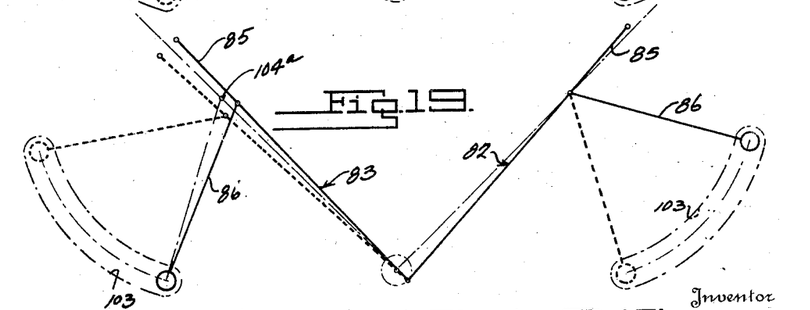

Referring to Figure 19, the full line positions indicated therein designate the positioning of the fulcrum arm and eccentric levers of the linkage mechanisms 82 and 83 as illustrated in Figure 2 of the drawings. Since in this position, the linkage mechanisms 82 and 83 provide for a counter clockwise rotation of the crank shaft C, it can readily be seen that by shifting the fulcrum arm from the full position to the dotted position by reason of the operating lever 107 and its incidental mechanism, the left hand eccentric lever 85 will be shifted in order to operate the valve 60.

When the reversing mechanism is thrown from the position in Figure 1, it can readily be seen that the left hand member 60 will not be affected in any manner whatsoever, since the same is in position to close both ports 51 and 52. However, as can readily be seen from Figure 18 of the drawings, the right hand linkage mechanism 82 will be so moved as to throw the valve member 60 from its position illustrated in Figure 1 to the position illustrated in Figure 11 or Figure 15 of the drawings. This movement of the right hand valve member 60 will automatically cut off steam from the port 52 and direct the steam into the pipe 51. This sudden switching of the admission of steam from one cylinder to the other of the right hand pair of cylinders 24 will, of course, start rotation of the crank shaft C in a counterclockwise direction. As the engine cam 78 rotates for a quarter turn from this new reversed position to the position illustrated in Figure 2, the valve 60 will be moved to accord with the position illustrated in Figure 2, in order to effect a counterclockwise movement of the crank shaft C. Similarly, where the linkage mechanisms 82 and 83 are thrown from the full line positioning illustrated in Figure 19 to the dotted line positioning by means of the reversing mechanism, the left hand valve member 60 would be the only valve member operated, and would effect a divergence of the steam, in such manner as to provide for a return to a clockwise rotation of the crank shaft C.

Admission of the steam into the cylinder continues for approximately three quarters of a piston travel therein. As this point, cut off takes place in order that the steam may expand in the cylinder. When the piston reaches the bottom of travel in the cylinder, the release takes place and the steam exhausts for approximately three quarters of a piston travel. At this point, the ports are closed to prevent any further exhaustion, and compression takes place.

From the above description of operation of the linkage mechanism and its effect upon the valves to effect clockwise or counterclockwise rotation of the crank shaft C, it can be seen that the ends 104 of the fulcrum arms 86 can be positioned at any position intermediate the ends of their guide slots 103, in order to shorten the travel of the valve members 60. Thus, when the ends 101 of the fulcrum arms 86 are midway of the ends of their guide slots 103, the travel of the valve members will be just equal to the amount of lap and lead, and all the valve ports will be covered, even during any travel of the valve members 60. The end 101 can, of course, be adjusted in the slots 103 to provide any desired power between neutral position and the maximum power derived when the fulcrum arm ends are in the ends of the guide slot.

The intake and exhaust pipe arrangement G preferably includes a steam inlet pipe 135 disposed axially of the improved engine A, and of course, upwardly of the engine, having the lateral pipes 136 and 137 leading to the intake conduits 67 of the right and left hand sets of cylinders respectively. Similarly, a steam outlet pipe 139 is arranged adjacent the inlet pipe 135, having the lateral pipes 140 and 141 leading to the exhaust pipes 66 and 68 of the right and left hand sets of cylinders respectively.

From the foregoing it can be seen that a single acting reversible steam engine has been provided which is of compact formation, novel in its operating arrangement, and which has but a minimum number of parts in order to effect the operation thereof.

Various changes in the shape, size and arrangement of parts may be made to the form of the invention herein shown and described, without departing from the spirit of the invention or the scope of the claims.

I claim:

1. A single acting engine comprising a casing embodying a set of cylinders, a crank shaft, pistons in said cylinders, means connecting said pistons to said crank shaft, a chest disposed substantially in straddling relation to the cylinders and having its end portions provided with side ports extending from opposite sides of the chest and communicating with separate cylinders, an intake conduit disposed in said chest intermediate said ports, exhaust conduits leading from the chest between the sides ports and ends of the chest, a piston type of valve member slidable in said chest and having heads disposed intermediate said intake and exhaust conduits for controlling flow of motor fluid from the ports therein thru the cylinders of the engines, and means for operating said valve members to synchronize the same with the piston action.

2. A single acting engine comprising a crank casing cylinder banks extending upwardly from said crank case in diverging relation and each embodying a pair of cylinders, a crank shaft rotatable in the crank case, pistons in said cylinders, means connecting said pistons to said crank shaft, a chest for each bank of cylinders extending transversely of the bank of cylinders and positioned in straddling relation thereto and having side ports extending from opposite sides of the chest in spaced relation to the ends thereof and communicating with separate cylinders, an intake conduit disposed in said chest intermediate said ports, exhaust conduits extending from the chest between the ends of the chest and said ports, a piston type of valve member in the chest including a pair of disc heads disposed between the intake and exhaust conduits and of the same diameter connected by a reduced portion said valve member being slidable in said steam chest so that each of said disc heads are slidable intermediate an intake and exhaust conduit for controlling flow of intake and exhaust through a port to a particular cylinder, and means for operating said valve, and means operated from the crank shaft for simultaneously operating the valve members for the banks of cylinders.

CHARLES T. McELVANEY.